United States Patent
Zakharov (10) Patent No.: US 9,826,112 B2
(45) Date of Patent: Nov. 21, 2017

(54) ENCODED ERROR FREQUENCY AS PRINTING DEVICE STATUS

(71) Applicant: KYOCERA Document Solutions Inc., Osaka (JP)

(72) Inventor: Oleg Y. Zakharov, Walnut Creek, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/964,137

(22) Filed: Dec. 9, 2015

(65) Prior Publication Data

US 2017/0171403 A1 Jun. 15, 2017

(51) Int. Cl.
*H04N 1/00* (2006.01)
*H04N 1/32* (2006.01)

(52) U.S. Cl.
CPC ..... *H04N 1/00344* (2013.01); *H04N 1/00007* (2013.01); *H04N 1/00037* (2013.01); *H04N 1/00074* (2013.01); *H04N 1/00832* (2013.01); *H04N 1/32625* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 5,850,582 A | 12/1998 | Inoo et al. | |
| 6,892,317 B1* | 5/2005 | Sampath | G06F 11/25 714/4.3 |
| 7,099,942 B1* | 8/2006 | Wilson | H04L 43/0817 709/223 |
| 2005/0149570 A1* | 7/2005 | Sasaki | G06Q 10/06 |
| 2009/0161143 A1* | 6/2009 | Nakamoto | G06F 11/1433 358/1.14 |
| 2011/0099272 A1* | 4/2011 | Takahashi | G06F 11/0733 709/224 |
| 2015/0120903 A1* | 4/2015 | Zakharov | H04L 41/5016 709/224 |
| 2016/0255209 A1* | 9/2016 | Zakharov | H04N 1/00029 358/1.15 |

FOREIGN PATENT DOCUMENTS

JP 2013123823 A * 6/2013

* cited by examiner

*Primary Examiner* — Barbara Reinier
(74) *Attorney, Agent, or Firm* — McDonnell Boehnen Hulbert & Berghoff LLP (57) ABSTRACT

Systems and methods for identifying the health status of one or more printing devices are provided. An example method can involve determining one or more printing-device error parameters. The method may also involve determining one or more error intervals based on the one or more printing-device error parameters. The method may also involve generating an error frequency code based on the determined error intervals. Still further, the method may involve determining a health value based on the error frequency code. The method yet further includes performing a managing action based on the determined health value.

20 Claims, 6 Drawing Sheets

| Error Code | Life Counter | Error Interval | Error Frequency |
|---|---|---|---|
| 0010 | 0 | - | - |
| 0010 | 100 | 100 | 1/100 |
| 0020 | 600 | 500 | 1/500 |
| 0010 | 700 | 100 | 1/100 |
| 0010 | 1,700 | 1,000 | 1/1,000 |
| 0015 | 1,705 | 5 | 1/5 |

| Device ID | F0 | F1 | F2 | F3 |
|---|---|---|---|---|
| ABC123 | 1 | 0 | 3 | 1 |

$1/10 < F0 \leq 1$ $1/100 < F1 \leq 1/10$ $1/1,000 < F2 \leq 1/100$ $1/10,000 < F3 \leq 1/1,000$

Fig. 3D

| Device: ABC123 | F0 | F1 | F2 | F3 |
|---|---|---|---|---|
| Linear Scale | 3 | 1 | 1 | 0 |
| Logarithm Scale | 1 | 0 | 3 | 1 |

| Device: DEF456 | F0 | F1 | F2 | F3 |
|---|---|---|---|---|
| Linear Scale | 1 | 3 | 1 | 0 |
| Logarithm Scale | 1 | 0 | 3 | 1 |

| Logarithm Scale | Linear Scale |
|---|---|
| $1/10 < F0 \leq 1$ | $1/400 < F0 \leq 1$ |
| $1/100 < F1 \leq 1/10$ | $1/800 < F1 \leq 1/400$ |
| $1/1{,}000 < F2 \leq 1/100$ | $1/1{,}200 < F2 \leq 1/800$ |
| $1/10{,}000 < F3 \leq 1/1{,}000$ | $1/1{,}600 < F3 \leq 1/1{,}200$ |

ENCODED ERROR FREQUENCY AS PRINTING DEVICE STATUS

BACKGROUND

Unless otherwise indicated herein, the description in this background section is not prior art to the claims in this application and is not admitted to be prior art by inclusion in this section. The present disclosure relates to methods and systems for identifying the health status of one or more printing devices.

Printing devices have increased in both number and complexity as a result of added functions, applications, and services that can be provided. As a result, the number and types of errors that occur on printing devices have increased as well. Improving and/or simplifying the ability to identify problematic printers can lead to faster repairs and maintenance, and can lead to higher customer satisfaction and better business results.

SUMMARY

In a first aspect, an example method is provided. The method preferably includes determining, for one or more printing devices, one or more printing-device error parameters. The method also includes determining, for each of the one or more printing devices, one or more error intervals based on the one or more printing-device error parameters. The method further includes generating, for each of the one or more printing devices, an error frequency code based on the determined error intervals. The method still further includes determining a health value of each of the one or more printing devices based on the error frequency codes. The method still further includes performing a managing action based on the determined health value of each of the one or more printing devices.

In a second aspect, an example non-transitory computer readable medium is provided. The non-transitory computer readable medium has stored thereon instructions that, when executed by a processor, cause performance of a set of acts including determining, for one or more printing devices, one or more printing-device error parameters. The set of acts also includes determining, for each of the one or more printing devices, one or more error intervals based on the one or more printing-device error parameters. The set of acts further includes generating, for each of the one or more printing devices, an error frequency code based on the determined error intervals. The set of acts yet further includes determining a health value of each of the one or more printing devices based on the error frequency codes. The set of acts still further includes performing a managing action based on the determined health value of each of the one or more printing devices.

In a third aspect, a system is provided. The system preferably includes one or more processors. The system also includes a memory storage that has instructions stored thereon that, when executed by the one or more processors, cause the system to perform a set of acts. The set of acts includes determining, for one or more printing devices, one or more printing-device error parameters. The set of acts also includes determining, for each of the one or more printing devices, one or more error intervals based on the one or more printing-device error parameters. The set of acts further includes generating, for each of the one or more printing devices, an error frequency code based on the determined error intervals. The set of acts yet further includes determining a health value of each of the one or more printing devices based on the error frequency codes. The set of acts still further includes performing a managing action based on the determined health value of each of the one or more printing devices.

These, as well as other aspects, alternatives, and advantages, will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims, are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Various functions described herein as being performed by one or more entities may be carried out by hardware, firmware, or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. OVERVIEW

Many organizations rely on properly functioning printing devices to operate effectively. Schools, offices, courtrooms, hospitals, and other types of organizations may use one or more printers in order to print forms, contracts, and/or other documents needed for the organization to run. In the event one or more errors occur on a printing device, it may take time and/or resources to fix the errors and return the printing device to a healthy state, which may adversely affect the organization. In order to identify printing devices that need maintenance, information about the errors that occur can be gathered. Some printing devices may have many errors during a given time period or over the course of printing a given number of pages, while other printing devices may have no errors or only a few. In addition to the number of errors that occur, the distribution of errors may be useful in determining a status of a printing device. Further, it may be useful to compare printing devices to classify or rank them according to their relative health statuses.

One purpose of the present disclosure is to provide methods and systems for identifying the health status of one or more printing devices. This may be done by determining an error frequency code for a given printing device and comparing the code to one or more codes corresponding to other printing devices. In some cases, a managing action or maintenance action may be taken based on a health status determined for a given printing device and/or comparison to other printing devices.

First, one or more printing-device error parameters may be determined for one or more printing devices. Error parameters may include an error code, a time stamp, and a print counter or life counter indicating the number of pages printed by a printing device. A set of error parameters may be determined for each error that occurs on a printing device.

Next, one or more error intervals may be determined based on the determined error parameters. For instance, error parameters for successive errors that occur on a given printing device may be compared to each other to determine a number of pages that were printed between errors, a time that elapsed between errors, or one or more other characteristics that changed between successive errors. The number of pages, elapsed time, or other changing characteristic may be the error interval. In some examples, an error interval may be determined for each pair of errors, such that a printing device that has five errors occur during a given time period will have four corresponding error intervals.

Next, an error frequency code may be generated for each printing device based on the determined error intervals. Generating the error frequency code for a given printing device may include defining frequency groups, such that each error interval corresponds to a particular frequency group. In one example, there may be four defined frequency groups. An error frequency code may be generated by placing each error interval into a corresponding frequency group, and concatenating, appending, or otherwise combining values of the frequency groups. The resulting distribution may be the error frequency code.

Next, the health value of each printing device may be determined based on its respective error frequency code. For example, a given printing device may have an error frequency code that indicates a lot of errors have occurred in quick succession. That error frequency code may be compared to a database or list of other error frequency codes, which may correspond to other printing devices. The comparison may be used to determine a health status of the given printing device. In some examples, a training set, or artificial set of data may be compared with the error frequency code to determine the health status. The artificial set of data may correspond to sampled or observed errors collected for one or more printing devices, or may be generated by a computing device. An algorithm such as a "machine learning" algorithm may correlate the artificial set of data with the errors and/or error frequency code of the printing device. The correlation may allow the artificial set to be used as a baseline, to calibrate one or more printing devices, or to determine a health status of the printing device.

Then, based on the determined health status, a managing action may be performed. In some examples the managing action may include transmitting a message, command, or other data to a printing device. In other examples, the managing action may include causing a maintenance worker to be dispatched to examine a printing device. Other managing actions are possible as well.

II. EXAMPLE SYSTEMS AND PRINTING DEVICES

Figure 1:
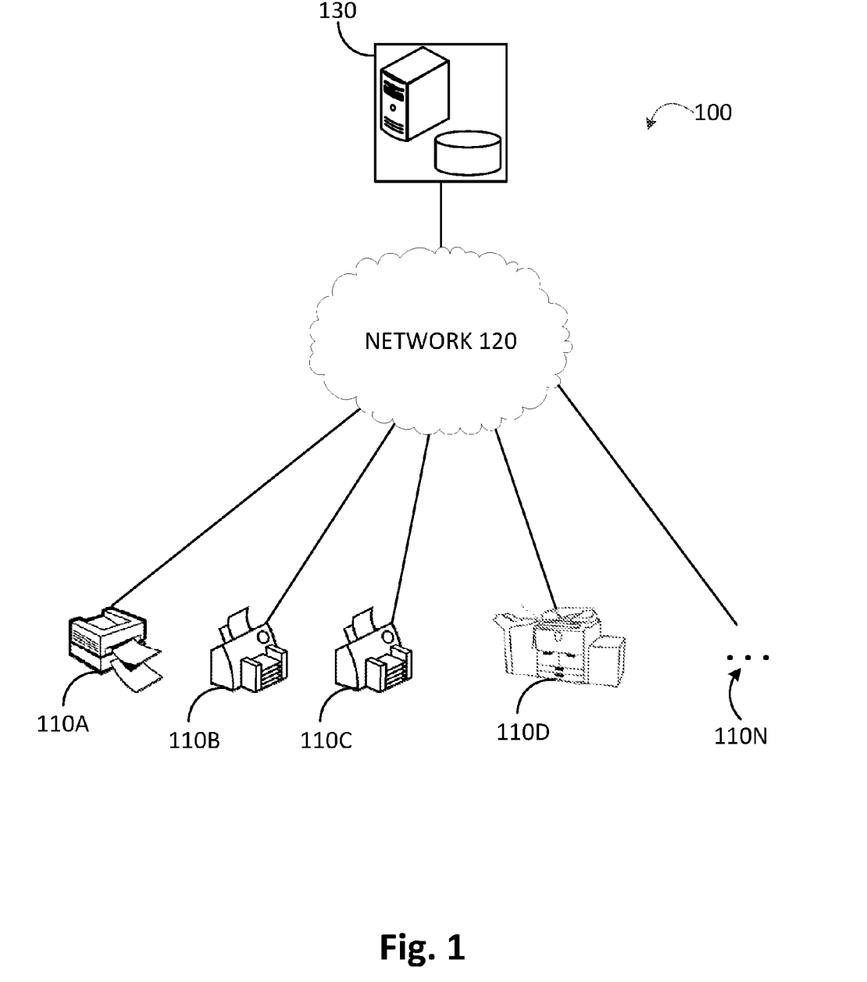
FIG. 1 is a block diagram illustrating an example system according to an embodiment of the present disclosure.

FIG. 1 is a block diagram illustrating an example system 100 according to an example embodiment of the present disclosure. System 100 may include one or more printing devices 110A-110N, and a server 130, which may be connected via a network 120. In some examples, system 100 may include more or fewer printing devices than are shown in FIG. 1, may include additional servers and/or computing devices, and/or may include one or more other systems or devices in addition to or instead of those shown in FIG. 1.

Printing devices 110A-110N may include one or more multi-function printing devices and/or stand-alone printing devices. A given printing device may be configured to perform one or more functions such as printing, scanning, emailing, storing, modifying, receiving, or transmitting one or more documents and/or files. In some examples, printing devices 110A-110N may include one or more computing devices such as computing device 200, or one or more components or aspects of computing device 200 described in more detail with respect to FIG. 2. In some examples, one or more of the printing devices 110A-110N may be connected to one or more personal computers, laptops, servers, handheld devices, and/or other computing devices and systems, which may be used in connection with the printing device to perform one or more actions, such as those described above.

Each printing device 110A-110N may be configured to perform one or more steps, actions, or functions described herein. For example, printing device 110A may communicate with server 130, to transmit and/or receive data or information via network 120 including error codes, print counter values, time stamps, error intervals, error frequency codes, time intervals, numbers of printed pages, numbers of errors, and other related information.

Server 130 may include a cloud based server, for example, that can perform one or more tasks to manage and/or maintain printing devices 110A-110N. Server 130 may communicate with printing devices 110A-110N to transmit or receive data. For instance, in some examples server 130 may transmit a command to the one or more printing devices 110A-110N to reset, install updates, or perform one or more printing or maintenance functions or operations. In other examples, server 130 may receive data from the one or more printing devices 110A-110N, such as error codes, print counter values, time stamps, error intervals, error frequency codes, time intervals, numbers of printed pages, numbers of errors, and other related information.

In some examples, server 130 may be configured to perform one or more functions or steps of the example methods and systems disclosed herein. For instance, server 130 may determine one or more printing-device error parameters for one or more printing devices. Server 130 may also determine one or more error intervals for the one or more printing devices. Further, server 130 may generate an error frequency code for each of the one or more printing devices. Then, based on the error frequency codes, server 130 may determine a health value of each respective printing device. Server 130 may then perform a managing action based on the determined health value, such as transmitting a message or dispatching a maintenance worker.

Server 130 may include one or more computing devices or systems (not shown), and may be consolidated in a single physical location, or distributed across two or more physical locations. Server 130 may include hardware, software, and/or firmware configured to carry out one or more functions or acts described herein.

Network 120 in the system 100 may include one or more wired or wireless connections that support communication between the devices of system 100. In some examples, network 120 may support one or more communication protocols, such as Extensible Messaging and Presence Protocol (XMPP), File Transfer Protocol (FTP), HyperText Transport Protocol (HTTP), Java Message Service (JMS), Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

Network 120 may be configured to allow communication between server 130 and one or more printing devices 110A-110N, between the printing devices 110A-110N themselves, and/or between one or more other devices or systems and the system 100. Such communications may include commands, requests, and/or data corresponding to documents, printing-device errors, and/or other data.

Figure 2:
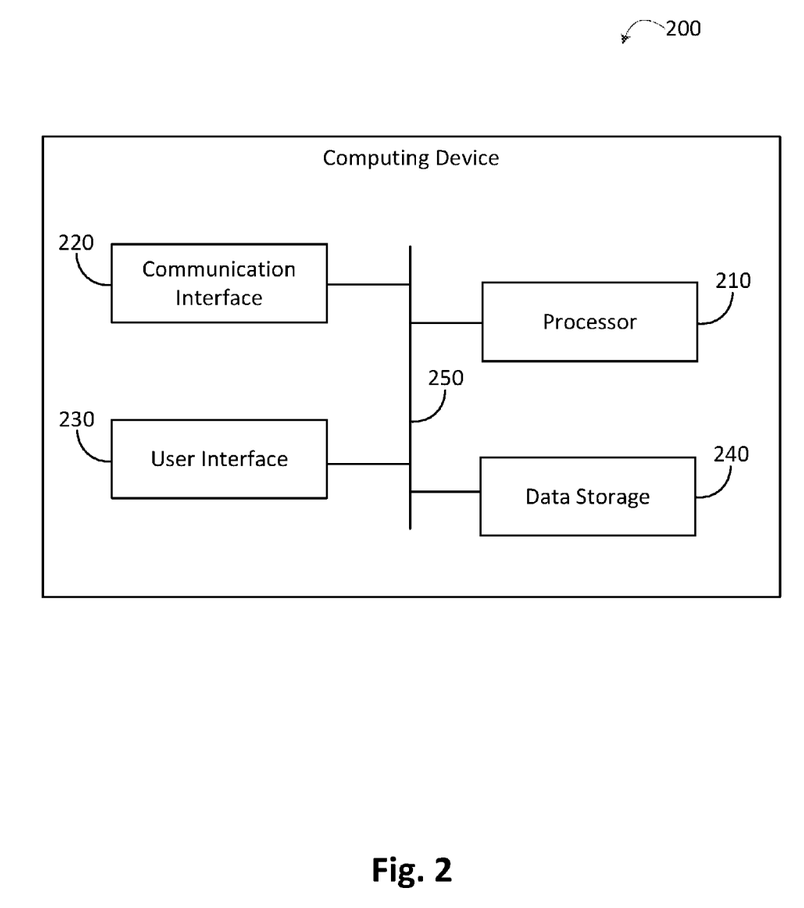
FIG. 2 is a block diagram illustrating an example computing device according to an embodiment of the present disclosure.

FIG. 2 is a block diagram illustrating an example computing device 200 according to an embodiment of the present disclosure. In some embodiments, computing device 200 may be configured for performing a variety of functions or acts, such as those described in this disclosure with respect to printing devices 110A-110N and server 130 of system 100, and with respect to one or more methods and systems described herein.

Computing device 200 may include one or more components, including for example, one or more processors 210, communication interfaces 220, user interfaces 230, and data storages 240. The components of computing device 200 may be communicatively connected to each other (or other devices or systems) via a system bus, network, or other link 250.

Processor 210 in computing device 200 may include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processor 210 may be configured to execute computer-readable program instructions contained in data storage 240, and/or other instructions as described herein.

Communication interface 220 in computing device 200 may be configured to allow computing device 200 to communicate with one or more devices (or systems) according to one or more protocols. In one example, communication interface 220 may be a wired interface, such as an Ethernet interface or a USB interface. As another example, communication interface 220 may be a wireless interface, such as a cellular or Wi-Fi interface, for example. Other example communication interfaces may include an Ethernet connection, Universal Serial Bus (USB) connection, fiber-optic link, coaxial cable, Bluetooth, ZigBee, WiMAX, wireless wide-area network (WWAN), and/or other similar type of interface.

Communication interface 220 of computing device 200 may allow one or more commands, requests, and/or data to be transmitted between the computing device and one or more other computing devices or systems, such as between one of printing devices 110A-110N and server 130 in system 100.

User interface 230 in computing device 200 may facilitate interaction with a user of the computing device, if applicable. As such, user interface 230 may include input components such as a keyboard, keypad, computer mouse, trackball, joystick, camera, microphone, voice recognition module, and touch sensitive panel, and output components such as a display screen (which, for example, may be combined with a touch sensitive panel), sound speaker, and haptic feedback system.

Data storage 240 in computing device 200 may include one or more volatile, non-volatile, removable, and/or non-removable storage components, such as magnetic, optical, or flash storage, and may be integrated in whole or in part with processor 210. Data storage 240 may store machine-readable instructions that, when executed by processor 210, cause performance of a set of acts or functions such as those described herein with respect to the devices, systems, methods, features, and embodiments. Such program instructions may define or be part of a discrete software application that can be executed in response to certain inputs received from user interface 230, for instance. Data storage 240 may also store other types of information or data, such as those types described throughout this disclosure (e.g., time interval, number of pages printed, number of printing-device errors, error types or error codes, and/or other data).

III. EXAMPLE EMBODIMENTS

Figure 3A:
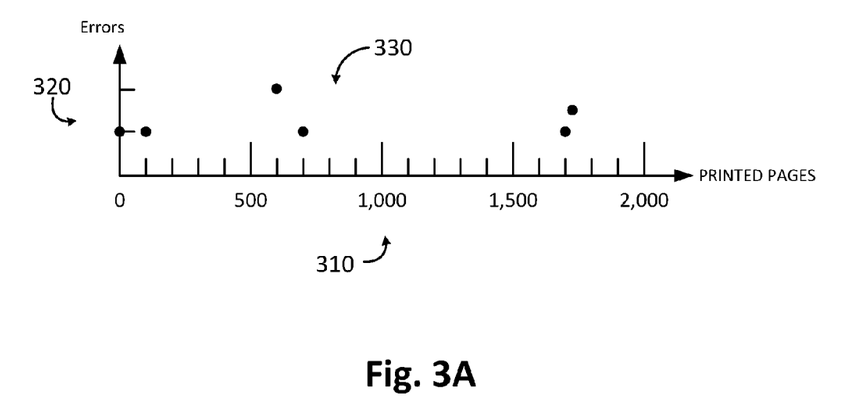
FIG. 3A is a graph illustrating an example distribution of printing-device errors.

FIG. 3A shows a graph illustrating an example distribution of printing-device errors according to embodiments of the present disclosure. Axis 310 corresponds to a number of printed pages and axis 320 corresponds to the type of error, while each mark 330 corresponds to an error. FIG. 3A corresponds to an error distribution for an example printing device. As the printing device prints more pages, the number of printed pages increases. As shown, errors occur on the example printing device at pages 0, 100, 600, 700, 1700, and 1705. This distribution of errors is shown as an illustrative example, and is merely representative of one possible distribution. Other printing devices may have more or fewer errors occur while printing more or fewer pages.

Figure 3B:
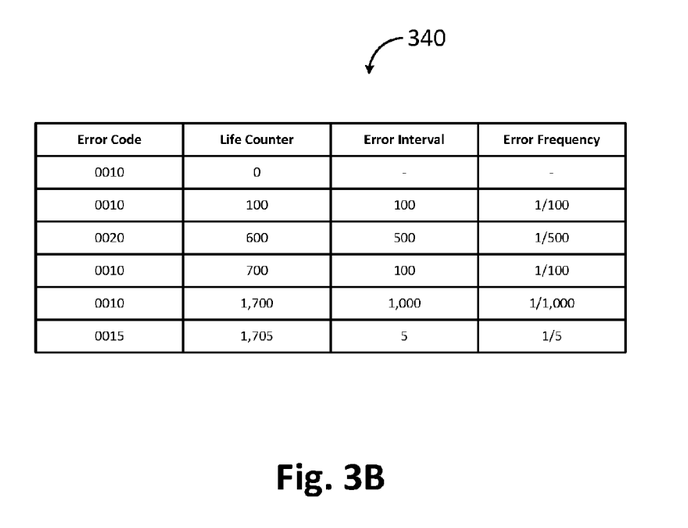
FIG. 3B is a chart illustrating example printing-device error parameters.

FIG. 3B shows a chart 340 illustrating example printing-device error parameters according to an example embodiment. The values in chart 340 correspond to the error distribution and example printing device described with respect to FIG. 3A. For instance, the "error code" values correspond to the error types on axis 320, and the "life counter" values correspond to the number of printed pages on axis 310. As such, each row in FIG. 3B corresponds to an error that occurs on the example printing device, and to one mark 330 in FIG. 3A.

The "error interval" values in FIG. 3B correspond to the number of pages printed by the printing device between successive errors. For instance, between the first error and the second error, the printing device printed 100 pages. Between the second and third errors, 500 pages were printed. And between the rest of the errors, respectively, 100, 1000, and 5 pages were printed.

The "error frequency" values for the example printing device can then be determined based on the error intervals. The error frequency is a value that reflects the instant frequency with which errors occur on the device. In an example where the error interval is the number of pages printed between errors, each error frequency thus reflects the number of errors per page printed. In another example where the error interval is a duration that has elapsed between errors, the error frequency may reflect the number of errors per hour, day, or some other chosen time interval. In addition, each error frequency may be determined based on an algorithm or formula that includes an error interval in addition to other data or information. In FIG. 3B, the determined error frequencies correspond to the number of errors per page printed, and are $\frac{1}{100}$, $\frac{1}{500}$, $\frac{1}{100}$, $\frac{1}{1000}$, and $\frac{1}{5}$.

Figure 3C:
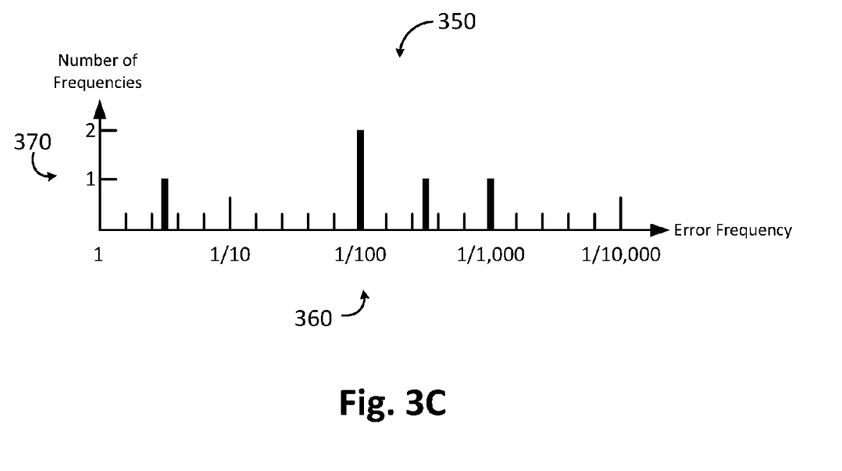
FIG. 3C is a graph illustrating an example distribution of error frequencies.

FIG. 3C shows a graph 350 illustrating an example distribution of error frequencies. Axis 360 shows error frequencies ranging from 1 error per page printed to 1 error per 10,000 pages printed. Axis 370 shows the number of error frequencies that fall into a given value. As shown, the error frequencies from FIG. 3B are displayed on graph 350, illustrating the distribution of error frequencies for the example printing device.

Figure 3D:
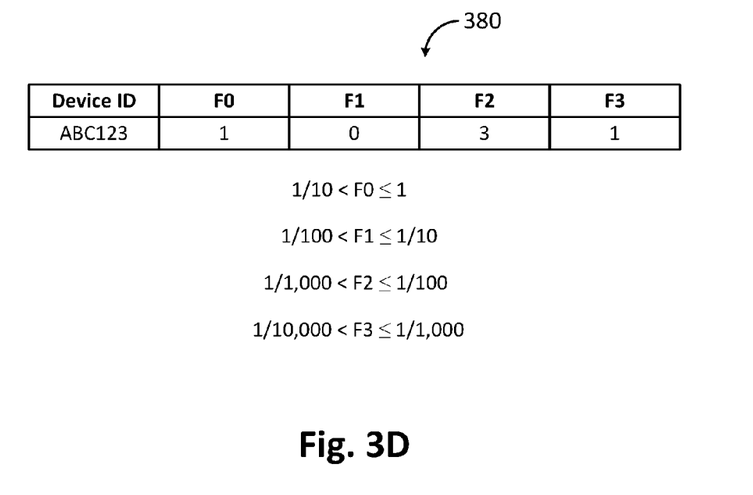
FIG. 3D is a chart illustrating an example error frequency code.

FIG. 3D shows a chart 380 illustrating an example error frequency code. F0, F1, F2, and F3 correspond to frequency groups as illustrated in FIG. 3D. In the example shown in FIG. 3D, the example printing device had one error frequency in group F0 (i.e., $\frac{1}{5}$), no error frequencies in group F1, three error frequencies in group F2 (i.e., $\frac{1}{100}$, $\frac{1}{500}$, and $\frac{1}{100}$), and 1 error frequency in group F3 (i.e., $\frac{1}{1000}$). Based on the data from FIGS. 3A-D, the error frequency code for the example printing device is "1-0-3-1."

Figure 3E:
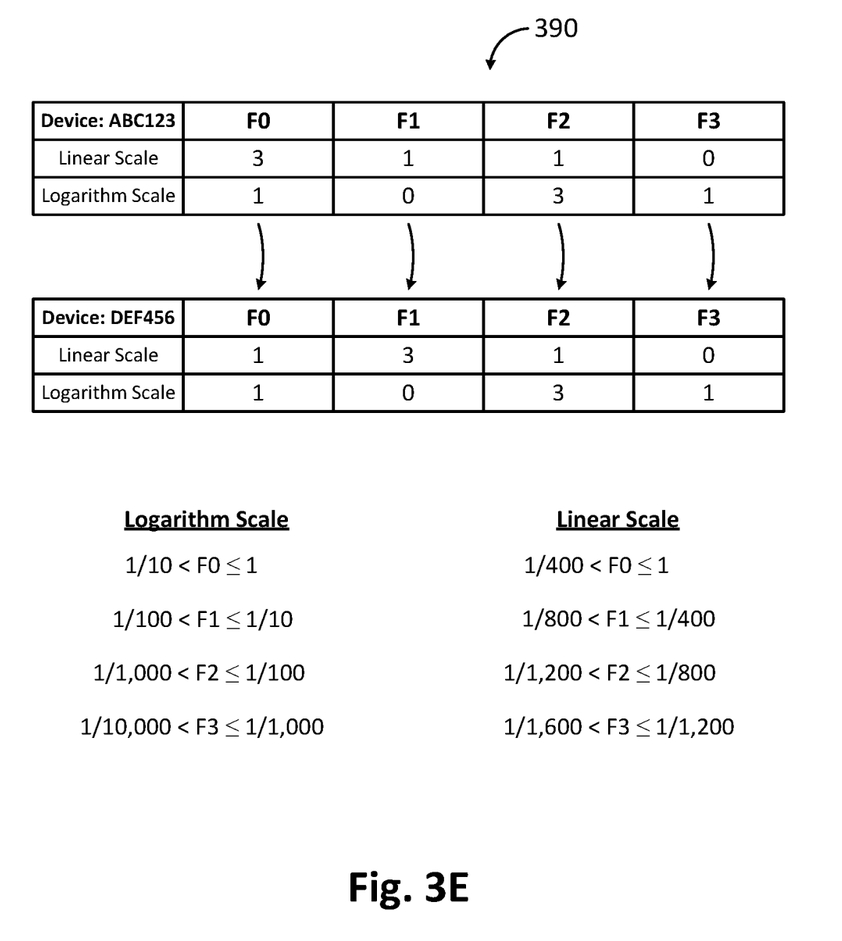
FIG. 3E is a chart illustrating example error frequency codes for two example printing devices.

FIG. 3E shows a chart 390 illustrating example error frequency codes for two printing devices, ABC123 and DEF456. F0, F1, F2, and F3 correspond to example frequency groups. In this example, two sets of frequency groups are determined based on a logarithmic scale and a linear scale, as shown in FIG. 3E. The scales shown in FIG. 3E are for illustrative purposes only, and other values may be used in some embodiments. Error frequencies determined for each printing device may be grouped based on the determined frequency groups. Then, the error frequency code(s) for each printing device may be generated based on either the linear scale values (i.e., generating a linear error frequency code), the logarithm scale values (i.e., generating a logarithmic error frequency code), or a combination of both. As an example illustration, printing device ABC123 in FIG. 3E has linear error frequency code 3-1-1-0 and logarithmic error frequency code 1-0-3-1.

In one embodiment, assume that an error frequency code and health status have already been determined for example printing device ABC123. The health status of a second printing device, example printing device DEF456, may be determined based on a comparison to printing device ABC123. For example, the linear and logarithmic scale values and/or error frequency codes generated therefrom may be compared. Where they are the same or within a predetermined threshold, as shown in FIG. 3E, the health status of printing device DEF456 may be determined to be the same as for printing device ABC123. Alternatively, where the values and/or error frequency codes are different, or differ by a threshold amount, a health status for printing device DEF456 may be determined to be different from that of printing device ABC123.

IV. EXAMPLE METHODS

Figure 4:
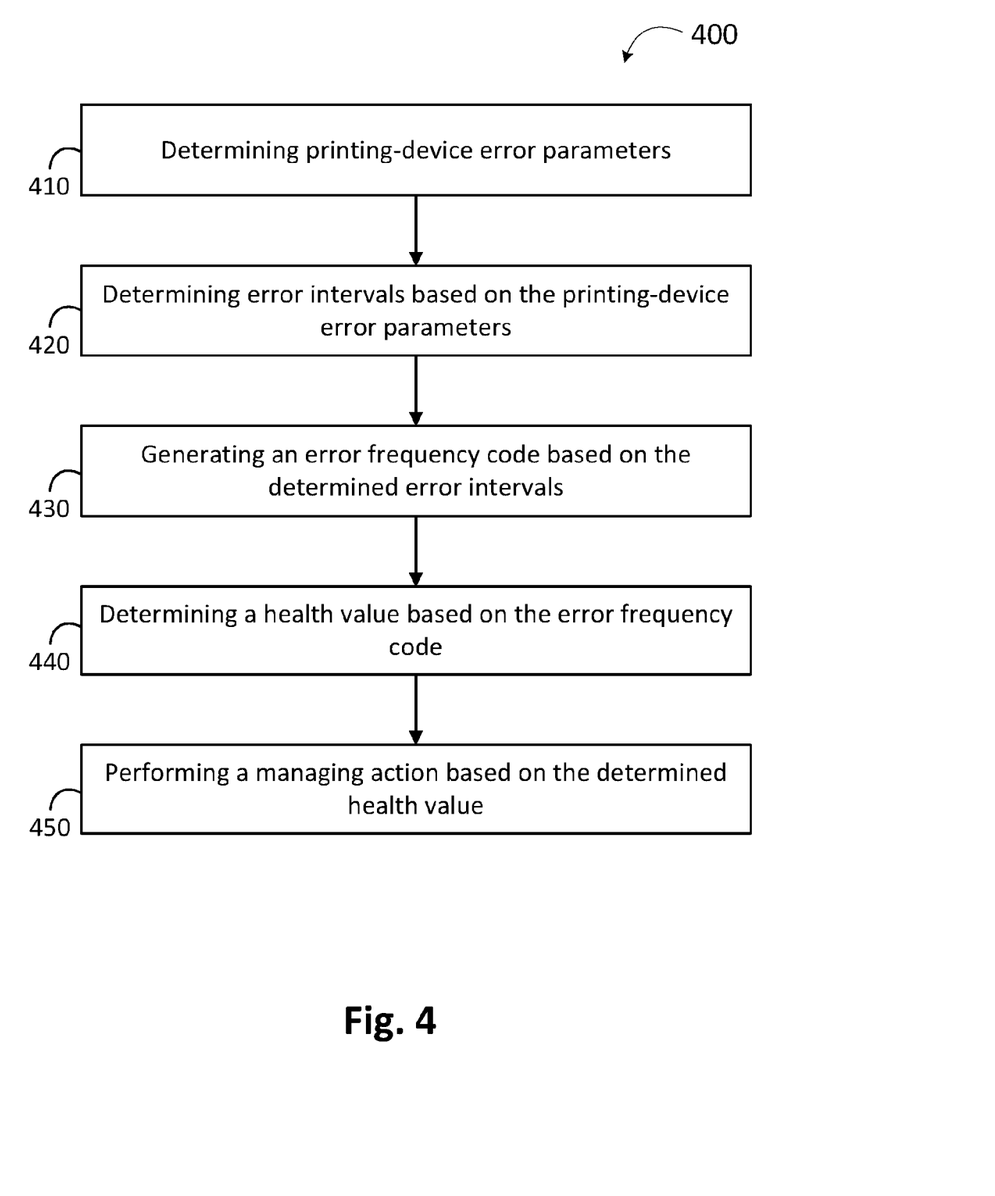
FIG. 4 is a flow chart illustrating an example method according to an embodiment of the present disclosure.

FIG. 4 is a flow chart illustrating an example method 400 according to an embodiment of the present disclosure. Although FIG. 4 illustrates method 400 as including certain blocks in a particular order, it should be understood that blocks may be added, subtracted, and/or carried out in a different order while remaining within the scope of this disclosure. Furthermore, some or all of the blocks of method 400 may be carried out by system 100 and/or the various components of system 100, including printing devices 110A-110N, and server 130 for example.

Method 400 may include blocks 410-450. At block 410, method 400 may involve determining printing-device error parameters. The error parameters may correspond to the state of a printing device when an error occurs, and may include an error code, print counter value, time stamp corresponding to the time at which the error occurs, and other related information. The error code may correspond to the type of error that occurs, such as a paper jam, empty tray, or communication problem. The print counter value may correspond to the number of pages printed by the printing device during its lifetime or another span of time, and may sometimes be referred to as a life counter. The time stamp may correspond to the time at which an error occurs. Other time stamps may be included as well, such as a timestamp associated with each printed page, printed document, or other printing device action.

In some examples, the printing device may be configured to store the error parameters. The printing device may include an internal or external storage component, which may store error parameters corresponding to one or more errors that occur on the printing device. The stored error parameters may be used by the printing device as discussed in this disclosure, or may be transmitted to another device or system such as server 130.

Printing device error parameters may be determined for a plurality of printing devices, such as printing devices 110A-110N in FIG. 1, for example. In some examples, each printing-device error parameter (and set of error parameters) may be determined by the respective printing device itself. For instance, in a system such as system 100 including a plurality of printing devices 110A-110N and server 130, each printing device 110A-110N may determine its own error parameters. Each printing device may include one or more components, devices, or systems, that can determine, generate, and/or store one or more error codes, numbers of printed pages, time stamps, and/or other data corresponding to errors that occur on each printing device.

In other examples, the printing device error parameters for a printing device may be determined by one or more connected devices or systems, such as server 130. Server 130 may be connected to one or more printing devices, and may receive data corresponding to errors that occur on the printing devices. The server 130 may then determine one or more error parameters for a respective printing device based on the received data.

In some examples, a relevant time period or print period may be determined before determining one or more printing-device error parameters. For instance, a time period of twenty-four hours may be determined first, and then the error parameters corresponding to one or more errors that occurred during that 24 hour period may be determined. In another example, a print period of 1000 pages may be determined first, and then the error parameters corresponding to the errors that occurred during the printing of that 1000 pages may be determined. In this way, only the error parameters corresponding to a subset of all errors that have occurred on a given printing device may be determined.

At block 420, method 400 may involve determining error intervals based on the printing-device error parameters.

Each error interval may be determined by comparing the error parameters corresponding to two errors that occur on a given printing device. For example, when a first error occurs, it may have error parameters that include an error code (0010), life counter value (0) and time stamp (0:00:00). When a second error occurs on the same printing device at a later time, it may have error parameters that include an error code (0010), life counter value (100), and time stamp (0:30:00). Determining an error interval corresponding to these two sets of error parameters may include determining the number of pages printed between successive errors, and setting, as an error interval, the difference in the number of pages printed (e.g., 100). Alternatively determining the error interval corresponding to these two sets of error parameters may include determining an elapsed duration between the errors and setting, as the error interval, the elapsed duration (e.g., 0:30:00). Other error intervals may be determined based on a comparison of one or more other error parameters.

In some examples, a plurality of error intervals may be determined. For an example printing device on which a plurality of errors occur, an error interval may be determined for each pair of errors, such that one error interval is determined between the first and second errors, one error interval is determined between the second and third errors, one error interval is determined between the third and fourth errors, and so on. The resulting number of determined error intervals may be one less than the number of errors that occur on a given printing device.

In some examples, the error intervals may be determined by the printing device itself. In other examples, a connected device or system may determine the error intervals. For instance, a printing device may transmit error parameters to server 130, either at the time the error occurs or at predetermined intervals, and server 130 may determine error intervals based on the error parameters.

At block 430, method 400 may involve generating an error frequency code based on the determined error intervals. Each error frequency code may correspond to a printing device over a predetermined period of time. In some examples, the error frequency code may be generated by the printing device itself. For instance, a printing device that determines the one or more error parameters and corresponding error intervals may also determine the error frequency code based on the determined error intervals.

In some examples, the error frequency code may be determined by first converting the error intervals into error frequencies. For instance, as shown in FIG. 3B the error intervals 100, 500, 100, 1000, and 5 are converted into error frequencies $\frac{1}{100}$, $\frac{1}{500}$, $\frac{1}{100}$, $\frac{1}{1000}$, and $\frac{1}{5}$ respectively. In this example the conversion between interval and frequency included taking a reciprocal value. In other examples, a different algorithm or formula may be used to convert the error intervals into corresponding error frequencies. In particular, where the error interval is specified as a duration (i.e., 0:30:00), determining the error frequency may include converting the duration into an error frequency defined in errors per minute (i.e., $\frac{1}{30}$). Other values are possible as well.

In some examples, the determined error frequencies may then be grouped into frequency groups. Frequency groups may be predetermined, or may change dynamically. As described earlier with respect to FIG. 3D, error frequency groups may be selected such that they cover a range of possible frequencies. In one example the frequency groups are selected based on a logarithmic scale. In another example, frequency groups may be selected based on a linear scale, or some other scale. As shown in FIGS. 3A-3D, the frequency groups are defined as F0, F1, F2, and F3. The error frequencies determined from the error intervals are then grouped based on those frequency groups. Determining the error frequency code may then include concatenating, appending, or otherwise combining the values of the frequency groups. For instance, in the example shown in FIGS. 3A-3D, the error frequency code is "1-0-3-1," corresponding to one error frequency in group F0, three error frequencies in group F2, and one error frequency in group F3.

At block 440, method 400 may involve determining a health value based on the error frequency code. The health value may indicate that the printing device is healthy, unhealthy, or unknown, for example. An unhealthy printing device may require maintenance, or another managing action. The health value may be a numerical value that indicates a likelihood that an error will occur or that maintenance will be required in a given time period. For example, the health value may indicate a likelihood (e.g., percentage) that the printing device will need maintenance in the next seven days.

In some examples, the printing device itself may determine its own health value. The printing device may compare the error frequency code to a predetermined set of stored values, which may indicate a status of the device. For instance, an error frequency code of "X-0-0-0," where "X" is greater than a preselected value, may indicate that several errors have occurred on the printing device in a short period of time, and maintenance is likely to be needed soon.

In some examples, a device or system connected to the printing device, such as server 130, may determine the health value of one or more printing devices based on an analysis of multiple error frequency codes. Server 130 may determine and/or receive a plurality of error frequency codes, and may classify, compare, or rank a plurality of printing devices. Server 130 may then determine that a printing device or subset of printing devices are more error-prone, or are more likely to need maintenance, and may responsively determine the health status of that printing device or subset.

At block 450, method 400 may involve performing a managing action based on the determined health value. Example managing actions may include transmitting a message or command to the printing device, such as a command to restart, install an update, or perform some other action. Other managing actions may include transmitting a message to one or more devices or systems indicating the status of the printing device, such as to a computer connected to the printing device (e.g., a network administrator or IT work station). In still other examples, the managing action may include causing a maintenance worker to be dispatched to the location of a printing device to perform maintenance. Other examples are possible as well.

V. EXAMPLE VARIATIONS

In some examples, the methods, operations, and acts described above may be performed for a specific duration of time, and or may be repeated. For instance, some printing devices are leased for a set duration such as a calendar year, and the methods, operations, and acts may be performed only during the set duration. Errors that occur either before or after the set duration may not be accounted for, saved, or otherwise used in carrying out the method, acts, and operations described above.

In one particular example, the set duration may be a twelve hour period from 8:00 am to 8:00 pm. This period may be repeated each business day, such that the methods, acts, and operations described above are performed during each twelve hour period on business days. Any errors that occur outside the set duration (i.e., overnight or on holidays) may not be included.

In some examples, the error intervals for one or more errors may be determined based on the start time of a set duration. To continue the example above, an error interval for each error that occurs during a set duration may be determined based on the elapsed time between a start time of the duration (T0) and a time at which each error occurs ($TE_1$, $TE_2$, ... $TE_N$). Suppose that the set duration is 8:00 am to 8:00 pm, and errors occur at 10:00 am, 11:00 am, and 5:00 pm. If 8:00 am is determined to be the start time (T0), the error intervals for these three errors may then be two hours, three hours, and nine hours respectively. The error frequencies, error frequency code, and health status of the printing device may then be determined in any manner such as those described above. Further, one or more of the linear, logarithmic, and/or other types of error frequency codes may be determined for each set duration. For example, a linear scale may be used for a first duration and a logarithmic scale may be used for a second duration of the same printing device.

Measuring the error interval for one or more errors from the start time of a set duration provides valuable information about the distribution of errors for a printing device. An error frequency code generated for a printing device that includes this information may be used to more accurately determine a health status of the printing device. Such health statuses may also be more specific than merely healthy or not healthy, such as by indicating when errors are likely to occur, and being able to help determine if outside factors (such as a power surge each day at 10:00 am) cause the printing device to have errors at regular intervals.

In some embodiments, the printing device may be a first printing device of a plurality of printing devices, and each printing device may perform one or more of the methods and operations disclosed herein. For example, where a system includes a plurality of printing devices 110A-110N, error parameters, error intervals, and error frequency codes corresponding to each printing device may be determined independently. Further, the health values for a plurality of printing devices may be determined independently, or may be determined based on a comparison of the error frequency codes corresponding to the plurality of printing devices.

VI. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the diagrams, examples, and flow charts in the figures and as discussed herein, each block and/or connection may represent a processing of information and/or a transmission of information in accordance with example embodiments. Alternative embodiments may be included within the scope of such example embodiments. Further, more or fewer blocks and/or functions may be used with any of the diagrams, examples, and flow charts discussed herein, and these diagrams, examples, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   determining, for one or more printing devices, one or more printing-device error parameters, wherein determining the one or more printing-device error parameters includes determining, for each of the one or more printing devices, that a printing-device error has occurred, and wherein the one or more printing-device error parameters comprise an error code, a print counter, and a timestamp, the print counter indicating a number of pages printed by the one or more printing devices;
   determining, for each of the one or more printing devices, one or more error intervals based on the one or more printing-device error parameters, wherein determining the one or more error intervals includes determining successive errors, and wherein each error interval corresponds to the number of pages printed between the successive errors;
  determining, for each of the one or more printing devices, error frequencies, wherein the error frequencies correspond to the number of errors per page printed;
  defining a plurality of frequency groups scaled according to at least one of a logarithmic scale, a linear scale, or a combination logarithmic and linear scale;
  grouping, for each of the one or more printing devices, the determined error frequencies into the respective plurality of scaled frequency groups;
  generating, for each of the one or more printing devices, an error frequency code based on which of the plurality of scaled frequency groups the determined error frequencies are grouped into;
  determining a health value of each of the one or more printing devices based on the determined error frequency codes, wherein determining the health value includes determining an error frequency code distribution and comparing the determined error frequency code distribution with an error frequency codes database; and
  performing a managing action based on the determined health value of each of the one or more printing devices.

2. The method of claim 1, further comprising:
  transmitting the determined printing-device error parameters to a server, wherein the server is configured for:
    determining, for each of the one or more printing devices, the one or more error intervals based on the one or more printing-device error parameters; and
    generating, for each of the one or more printing devices, the error frequency code based on the determined error intervals.

3. The method of claim 1, further comprising:
  transmitting, to a server, the error frequency code generated for each of the one or more printing devices based on the determined error intervals, wherein the server is configured for determining the health value of each of the one or more printing devices based on the error frequency codes.

4. The method of claim 1, wherein determining, for each of the one or more printing devices, the one or more error intervals based on the one or more printing-device error parameters comprises determining a number of pages printed between successive errors, and setting, as one of the one or more error intervals, the determined number of pages.

5. The method of claim 1, wherein determining, for each of the one or more printing devices, the one or more error intervals based on the one or more printing-device error parameters comprises determining an elapsed duration between successive errors, and setting, as one of the one or more error intervals, the elapsed duration.

6. The method of claim 1, wherein generating, for each of the one or more printing devices, an error frequency code based on the determined error intervals comprises:
  grouping the one or more determined error intervals based on a logarithmic scale; and wherein generating, for each of the one or more printing devices, an error frequency code based on the determined error intervals comprises generating an error frequency code based on the grouped error intervals.

7. The method of claim 1, wherein determining the health value of each of the one or more printing devices based on the error frequency codes comprises:
  comparing the error frequency code of a first printing device to the error frequency code of a second printing device of the one or more printing devices; and
  determining the health value of the first printing device based on the comparison.

8. The method of claim 1, wherein performing the managing action based on the determined health value of each of the one or more printing devices comprises transmitting, for each of the one or more printing devices, a message indicating the health value of the printing device.

9. A non-transitory, computer-readable medium, having instructions stored thereon, that, when executed by one or more computing devices, cause performance of a set of acts comprising:
  determining, for one or more printing devices, one or more printing-device error parameters, wherein determining the one or more printing-device error parameters includes determining, for each of the one or more printing devices, that a printing-device error has occurred, and wherein the one or more printing-device error parameters comprise an error code, a print counter, and a timestamp, the print counter indicating a number of pages printed by the one or more printing devices;
  determining, for each of the one or more printing devices, one or more error intervals based on the one or more printing-device error parameters, wherein determining the one or more error intervals includes determining successive errors, and wherein each error interval corresponds to the number of pages printed between the successive errors;
  determining, for each of the one or more printing devices, error frequencies, wherein the error frequencies correspond to the number of errors per page printed;
  defining a plurality of frequency groups scaled according to at least one of a logarithmic scale, a linear scale, or a combination logarithmic and linear scale;
  grouping, for each of the one or more printing devices, the determined error frequencies into the respective plurality of scaled frequency groups;
  generating, for each of the one or more printing devices, an error frequency code based on which of the plurality of scaled frequency groups the determined error frequencies are grouped into;
  determining a health value of each of the one or more printing devices based on the determined error frequency codes, wherein determining the health value includes determining error frequency code distribution and comparing the determined error frequency code distribution with error frequency codes database; and
  performing a managing action based on the determined health value of each of the one or more printing devices.

10. The non-transitory, computer-readable medium of claim 9, the set of acts further comprising:
  transmitting the determined printing-device error parameters to a server, wherein the server is configured for:
    determining, for each of the one or more printing devices, the one or more error intervals based on the one or more printing-device error parameters; and
    generating, for each of the one or more printing devices, the error frequency code based on the determined error intervals.

11. The non-transitory, computer-readable medium of claim 9, the set of acts further comprising:
  transmitting, to a server, the error frequency code generated for each of the one or more printing devices based on the determined error intervals, wherein the server is configured for determining the health value of each of the one or more printing devices based on the error frequency codes.

12. The non-transitory, computer-readable medium of claim 9, wherein determining, for each of the one or more printing devices, the one or more error intervals based on the one or more printing-device error parameters comprises determining a number of pages printed between successive errors, and setting, as one of the one or more error intervals, the determined number of pages.

13. The non-transitory, computer-readable medium of claim 9, wherein determining, for each of the one or more printing devices, the one or more error intervals based on the one or more printing-device error parameters comprises determining an elapsed duration between successive errors, and setting, as one of the one or more error intervals, the elapsed duration.

14. The non-transitory, computer-readable medium of claim 9, wherein generating, for each of the one or more printing devices, an error frequency code based on the determined error intervals comprises:
grouping the one or more determined error intervals based on a logarithmic scale; and wherein generating, for each of the one or more printing devices, an error frequency code based on the determined error intervals comprises generating an error frequency code based on the grouped error intervals.

15. The non-transitory, computer-readable medium of claim 9, wherein determining the health value of each of the one or more printing devices based on the error frequency codes comprises:
comparing the error frequency code of a first printing device to the error frequency code of a second printing device of the one or more printing devices; and
determining the health value of the first printing device based on the comparison.

16. The non-transitory, computer-readable medium of claim 9, wherein performing the managing action based on the determined health value of each of the one or more printing devices comprises transmitting, for each of the one or more printing devices, a message indicating the health value of the printing device.

17. A system comprising,
one or more processors; and
a memory storage having instructions stored thereon that when executed by the one or more processors cause the system to perform a set of acts comprising:
determining, for one or more printing devices, one or more printing-device error parameters, wherein determining the one or more printing-device error parameters includes determining, for each of the one or more printing devices, that a printing-device error has occurred, and wherein the one or more printing-device error parameters comprise an error code, a print counter, and a timestamp, the print counter indicating number of pages printed by the one or more printing devices;
determining, for each of the one or more printing devices, one or more error intervals based on the one or more printing-device error parameters, wherein determining the one or more error intervals includes determining successive errors, and wherein each error interval corresponds to a number of pages printed between the successive errors;
determining, for each of the one or more printing devices, error frequencies, wherein the error frequencies correspond to the number of errors per page printed;
defining a plurality of frequency groups scaled according to at least one of a logarithmic scale, a linear scale, or a combination logarithmic and linear scale;
grouping, for each of the one or more printing devices, the determined error frequencies into the respective plurality of scaled frequency groups;
generating, for each of the one or more printing devices, an error frequency code based on which of the plurality of scaled frequency groups the determined error frequencies are grouped into;
determining a health value of each of the one or more printing devices based on the determined error frequency codes, wherein determining the health value includes determining error frequency code distribution and comparing the determined error frequency code distribution with error frequency codes database; and
performing a managing action based on the determined health value of each of the one or more printing devices.

18. The system of claim 17, the set of acts further comprising:
transmitting the determined printing-device error parameters to a server, wherein the server is configured for:
determining, for each of the one or more printing devices, the one or more error intervals based on the one or more printing-device error parameters; and
generating, for each of the one or more printing devices, the error frequency code based on the determined error intervals.

19. The system of claim 17, the set of acts further comprising:
transmitting, to a server, the error frequency code generated for each of the one or more printing devices based on the determined error intervals, wherein the server is configured for determining the health value of each of the one or more printing devices based on the error frequency codes.

20. The system of claim 17, wherein performing the managing action based on the determined health value of each of the one or more printing devices comprises transmitting, for each of the one or more printing devices, a message indicating the health value of the printing device.

* * * * *